(12) United States Patent
Hillier et al.

(10) Patent No.: US 7,142,676 B1
(45) Date of Patent: Nov. 28, 2006

(54) METHOD AND APPARATUS FOR SECURE COMMUNICATIONS USING THIRD-PARTY KEY PROVIDER

(75) Inventors: Stephen William Hillier, Ottawa (CA); Dineshbhai Solanki, Nepean (CA); Eric C. Jacksch, Ottawa (CA)

(73) Assignee: Entrust Limited, Ottawa (CA)

( * ) Notice: Subject to any disclaimer, the term of this patent is extended or adjusted under 35 U.S.C. 154(b) by 0 days.

(21) Appl. No.: 09/328,066

(22) Filed: Jun. 8, 1999

(51) Int. Cl.
*H04K 1/00* (2006.01)
*H04L 9/00* (2006.01)
*G06Q 99/00* (2006.01)

(52) U.S. Cl. ............... 380/278; 380/258; 380/282; 380/284; 713/153; 705/53

(58) Field of Classification Search ............... 380/278, 380/282, 45; 713/153; 705/53, 51
See application file for complete search history.

(56) References Cited

U.S. PATENT DOCUMENTS

| | | | | |
|---|---|---|---|---|
| 4,683,968 A | * | 8/1987 | Appelbaum et al. | 705/59 |
| 4,712,238 A | * | 12/1987 | Gilhousen et al. | 380/232 |
| 5,351,295 A | * | 9/1994 | Perlman et al. | 705/78 |
| 5,481,613 A | * | 1/1996 | Ford et al. | 380/30 |
| 5,564,106 A | * | 10/1996 | Puhl et al. | 380/286 |
| 5,666,420 A | * | 9/1997 | Micali | 380/286 |
| 5,673,316 A | * | 9/1997 | Auerbach et al. | 705/51 |
| 5,920,630 A | * | 7/1999 | Wertheimer et al. | 380/286 |

OTHER PUBLICATIONS

Menezes, Alfred J., van Oorschot, Paul C. and Vanstone, Scott A., Handbook of Applied Cryptography, 1997, pp. 546-550.
On line article, "VeriSign OnSite Solves PKI Setup Dilemma," dated Dec. 8, 1998, by Ken Philips, Ziff-Davis Publishing.

* cited by examiner

*Primary Examiner*—Kambiz Zand
*Assistant Examiner*—Benjamin E. Lanier
(74) *Attorney, Agent, or Firm*—Vedder, Price, Kaufman & Kammholz, P.C.

(57) ABSTRACT

A method and apparatus for securely communicating data employs a third-party to facilitate decryption by the recipient. It is necessary for the recipient to interact with the third-party to decrypt received encrypted data. The third-party is unable to decrypt or read the encrypted data and records whether the recipient requested a decryption key generated by the third-party. The third party logs the request from the second party for the decryption key. The originator may then obtain the delivery status of the data from the third party to facilitate proof of submission, proof of delivery, or any other suitable information.

36 Claims, 7 Drawing Sheets

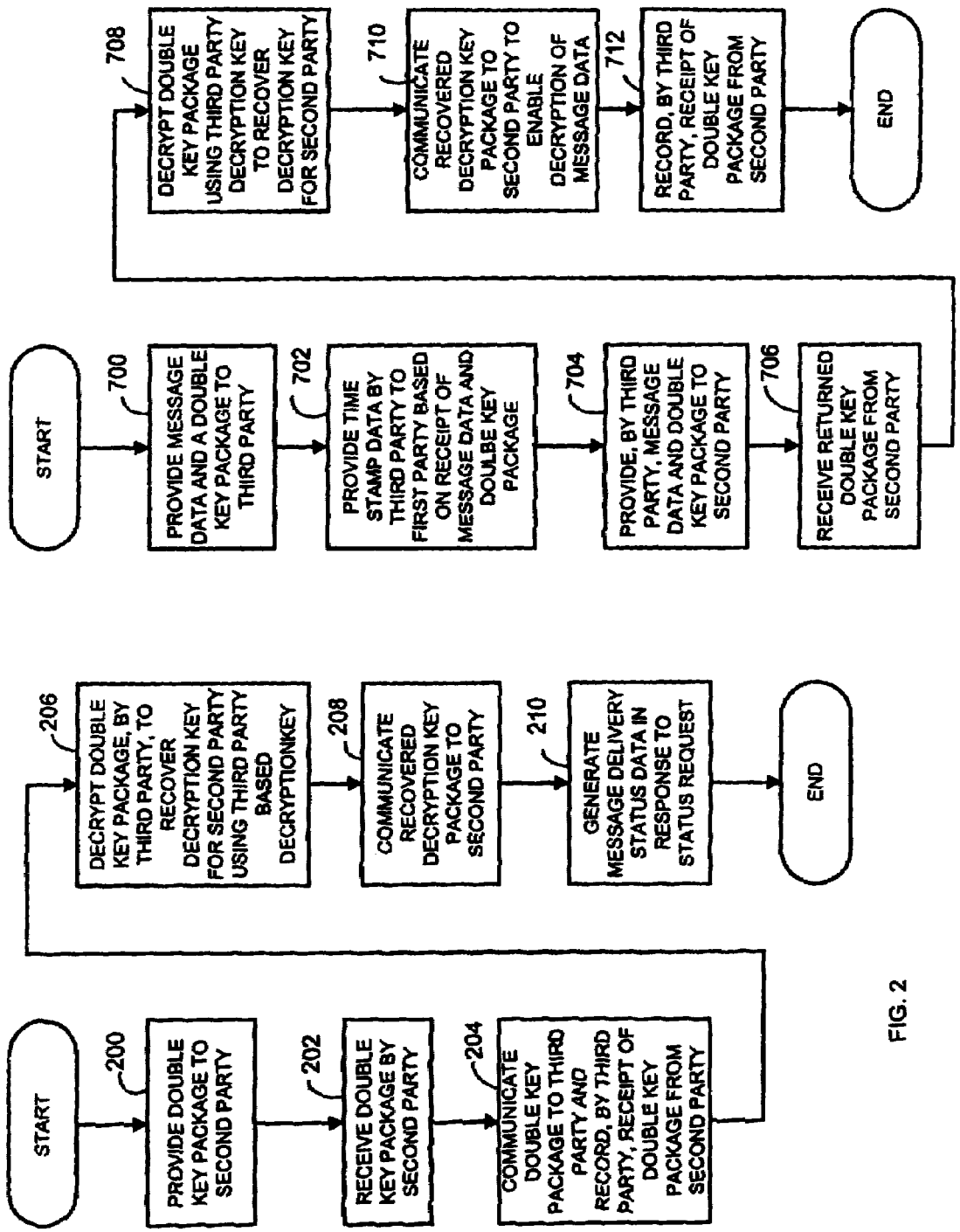

METHOD AND APPARATUS FOR SECURE COMMUNICATIONS USING THIRD-PARTY KEY PROVIDER

FIELD OF THE INVENTION

The invention relates generally to systems and methods employing information encryption for secure data communication, and more particularly to systems and methods employing third-party enabling of secure data delivery.

BACKGROUND OF THE INVENTION

There is a desire to reduce the amount of paper flow in many of today's business and non-business environments. For example, it would be desirable to provide some type of electronic postage delivery system to enhance electronic mail or electronically communicated information among different parties in a session or transaction. Information systems are increasingly employing data encryption algorithms, cryptographic engines, and devices to facilitate secure communication of data from one point to another. In addition, digital signature techniques are also being used to apply a digital signature to encrypted or unencrypted data so that the recipient can determine the source of the data accompanying digital signature. As known, both asymmetric and symmetric cryptography systems may be employed to facilitate the encryption, and decryption in digital signing of information.

Many postal systems use a form of recorded document delivery indicating that a particular piece of paper mail was forwarded to a particular address. This may typically include, for example, a postal employee delivering by hand the mail and having a person that receives the particular piece of mail, sign a receipt. This person may or may not be the intended recipient. In addition, the postal employee may also sign a receipt indicating that it was delivered to a particular address. Also, many other document delivery processes are in place to provide proof of delivery of a particular piece of mail. For example, the actual signature of the recipient may be required before the piece of postal mail is left with the recipient. However, typical postal delivery systems require the use of postal employees throughout the various steps in the process and can take many hours and even days. Consequently, a desire exists to reduce the cost of such systems while attempting to increase the speed of delivery of information. The information must also be delivered in a secure manner to avoid detection by unscrupulous parties and should be secure from point to point so a third party does not have access to the information.

Privacy enhanced electronic data is well-known. For example, encrypted e-mails may be sent over the internet or other suitable network to another party. Public key and private key cryptographic systems also are well-known and typically employ a public encryption key and private decryption key and, if desired, a private signing key and public verification key. Today when electronic data is sent in encrypted form, for example to a recipient, there may be some indications as to whether or not the recipient received the message, however, the recipient can disconnect the link before reading a message and interrupt a verification message back to the sender indicating that the message had been received. If the data included a bill, the recipient could potentially claim that they never received the information.

Also as known, security tokens are typically sent as encrypted messages which may include, for example, security related information to provide the necessary encryption and decryption of information. For example, a security token may include data representing the algorithm that was used to perform the encryption and digital signature. The security token may also include the digital signature of the sender as well as an encrypted symmetric key. Generally, the symmetric key is used to encrypt the information and the public key of the recipient is used to encrypt the symmetric key. As such, the encryption process may include, for example, using a symmetric encryption process like DES. A symmetric key is encrypted using the recipients public asymmetric encryption key. The recipient uses its private decryption key to decrypt the encrypted symmetric key and uses the symmetric key to decrypt the contents so only the recipient can decrypt the information. Systems typically do not also encrypt the security token.

One technique used to help insure that the delivery of information has taken place may include, for example, the use of a digital notary system. In such a system, a sender sends data to a trusted third party. The trusted third party digitally signs the data and appends a time to the data. The signed data may then be sent back to the originator or forwarded to a recipient. The recipient then performs standard digital signature verification on the notary signature and then obtains the encrypted content and performs the decryption. However, such systems do not typically require that the notary provide a recipient with a decryption key or other data unlocking mechanism. Also desired, the sender may digitally sign the encrypted information and the notary first performs standard verification of originator's signature to ensure that the sender is a trusted party to the system. However, since typical digital notaries may store the encrypted message, they still provide some type of security risk even though they may be considered a trusted authority.

Consequently, there exists a need for a method apparatus for securely communicating data. It would be desirable if such a system and method employed some type of third-party enabling of secure data delivery so that proof of document submission and/or proof of delivery of a document, or other data, may be accommodated.

BRIEF DESCRIPTION OF THE DRAWINGS

FIG. 2 is a flow-chart illustrating the operation of the apparatus of FIG. 1.

FIG. 7 is a flow-chart illustrating the operation of the system shown in FIG. 6.

DETAILED DESCRIPTION OF THE PREFERRED EMBODIMENT

Figure 1:
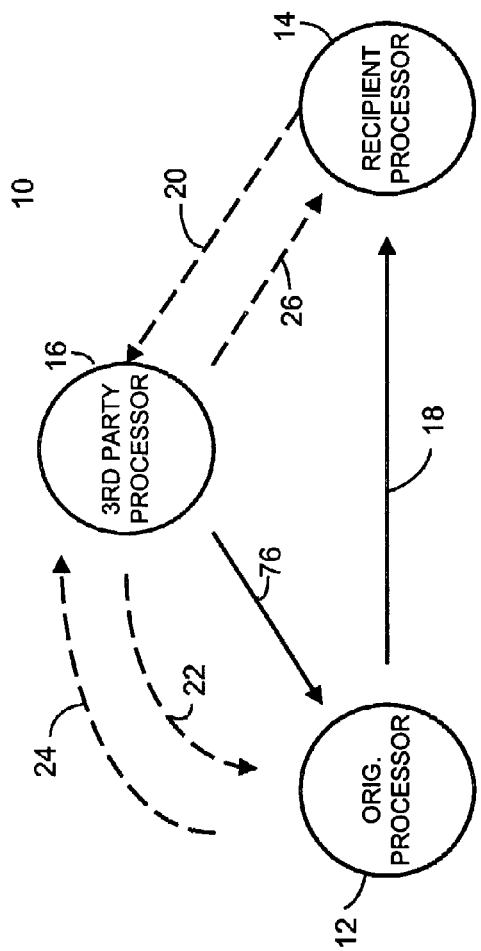
FIG. 1 is a pictorial representation of one example of an apparatus for securely communicating data in accordance with one embodiment of the invention.

Briefly, a method and apparatus for securely communicating data employs a third-party to facilitate decryption by the recipient. It is necessary for the recipient to interact with the third-party to decrypt received encrypted data. The third-party is unable to decrypt or read the encrypted data and records whether the recipient requested a decryption key generated by the third-party.

In one embodiment, the method and system includes providing by a first-party, such as an originator, a double key package to a second-party, such as a recipient. The double key package contains, in a protected manner, the symmetric key used to decrypt the encrypted data. The symmetric key is protected through the double application of asymmetric public key encryption. One application of asymmetric public key encryption uses a public key associated with the second party while the other application of asymmetric public key encryption uses a public key associated with a third party. Examples of asymmetric encryption algorithms include RSA, Diffie-Hellman, ElGamal, elliptic curve, variations of these and any other suitable techniques as known in the art. The second-party communicates the double key package to the third-party and is unable to decrypt encrypted data until the third-party has provided access to a decryption key contained in the double key package. As such, the third-party decrypts at least part of the double key package to provide second party access to the decryption key using the third-party based decryption key (the third party associated private asymmetric decryption key) to facilitate mandatory communication between the second-party and the third-party. Preferably, the third party does not have access to the symmetric key that protects the ciphertext. The double key package includes, for example, ciphertext if desired, an encrypted key and another key. Preferably, the ciphertext is not sent to the third-party.

The recipient requests the decryption key from the third-party. The third-party logs the request and returns the decryption key to the recipient. The third-party may if desired, return a report to the originator indicating that the recipient has retrieved the key and has, therefore, received the message (the encrypted data). The originator may query the third-party for the status of the message whereafter the third-party returns a response to the originator's query indicating whether the decryption key has been communicated to the recipient. Hence the third party may generate message delivery status data in response to authorized status request data. The authorized request may be a digitally signed request, password based request or any other suitable request. If digitally signed, the third party processes the signed status request by verifying a digital signature on the authorized request; and determines authorization of a party seeking the request based on identification data obtained from the authorized request.

In another embodiment, this system and method allows an originating processor, such as a first-party, to provide message data and (encrypted) the double key package to the third-party. The third-party provides time stamp data to the originating party based on receipt of the message data and the double key package, as proof of submission to the originator. The third-party then communicates the message data and double key package to the recipient. The recipient initiates a request to the third-party to request the key to decipher the encrypted data. The third-party logs the request and returns the decryption key to the recipient. As such, the third-party, after sending message data and double key package to the second-party, receives the double key package back from the recipient. The third-party then partially decrypts the double key package using a third-party decryption key, then communicates the recovered decryption key package to recipient so that the recipient can recover the plaintext. Because the third-party is the only party that can determine the decryption key, communication is required between the recipient and the third-party. In this embodiment, the third-party returns a time stamp that provides proof of submission that the message was submitted for the intended recipient.

FIG. 1 shows one embodiment of a secure data communication system 10 employing an originator processor as a first-party 12, a recipient processor as a second-party 14 and a third-party processor 16. As used herein, the parties may include any suitable computing device, data processing device, software application or other suitable entity that facilitates communication of encrypted data as disclosed herein. The solid arrow lines represent, for example, an SMTP connection such as through the internet or intranet and the dashed arrow lines represent, for example, point-to-point TCP/IP connection. However, it will be recognized that any suitable link, whether radio frequency or otherwise and any suitable protocol may be used. In this embodiment, a message originator through the originator processor 12 sends encrypted messages directly to the intended recipient or recipients. However, in order to read the message data, such as any suitable encrypted data or information, the recipient processor 14 must initiate a request to the third-party processor 16 to obtain an appropriate cryptographic key to decipher the encrypted message. The third-party processor may, for example, a post-office node or server or other suitable message delivery unit. Each of the arrowed lines represents a communication between the respective processors.

Referring to FIGS. 1–3b, an originator processor 12 provides, for example, a signed message with third-party based encrypted security token 18 to the recipient processor 14. The signed message with third-party based encrypted security token 18 includes a double key package 19 and accompanying ciphertext 45. This is shown in block 200. The recipient processor 14 receives the signed message with third-party based encrypted security token 18 as shown in block 202. As shown in block 204, the recipient processor 14 generates a request 20 to request a cryptographic key to decipher encrypted message data. As part of the request, the recipient processor passes the double key package 19 to the third-party processor 16. The request is logged by the third-party processor 16 so that the third-party processor 16 may provide message delivery status data through a query reply 22 based upon an authorized delivery status request 24 from the originator processor 12. The status request may be in the format of a digitally signed message, a MAC based request or any other suitable authenticated request format.

As shown in block 206, the third-party processor 16 partially decrypts the double key package 19 using a third-party based decryption key, such as a private decryption key of a public key pair, to recover the decryption key (may or may not be encrypted) for the second-party. This facilitates mandatory communication between the recipient processor (second-party) and the third-party 16 since the recipient can not fully decrypt the encrypted data without the key obtained from the third-party. As shown in block 208, the third-party processor, after logging the request, returns the recovered decryption key in a reply message 26 to the recipient processor 14. As shown in block 210, the third-party processor 16 generates message delivery status data 22 in response to the signed delivery status request 24. A mandatory interaction between the recipient and the third-party, allows the third-party to generate a record confirming that a recipient actually received the data package (or messages double key package). Although there is no need to send the ciphertext, the recipient request 20 may include the ciphertext since only the recipient processor has access to the private decryption key. For example, when a system is used with a public key/private key cryptography system or other asymmetric system, a recipient's public encryption key is used as described below to generate the message data. Alternatively, the message data may be kept by the recipient processor and only encryption key packages need be submitted to the third-party from which a decryption key is obtained for the recipient processor 14.

A technique for logging the request may include, for example, having the third-party processor 16 use a hash code of the message or encrypted message as a correlation identifier wherein the identifier would form part of a query when the originator processor requested the third-party processor to determine whether or not a message data was received by the recipient processor 14. As such, using hash codes effectively provides a unique query code that does not require complicated procedural management for splitting up the sequence of unused serial numbers for example.

Figure 3A:
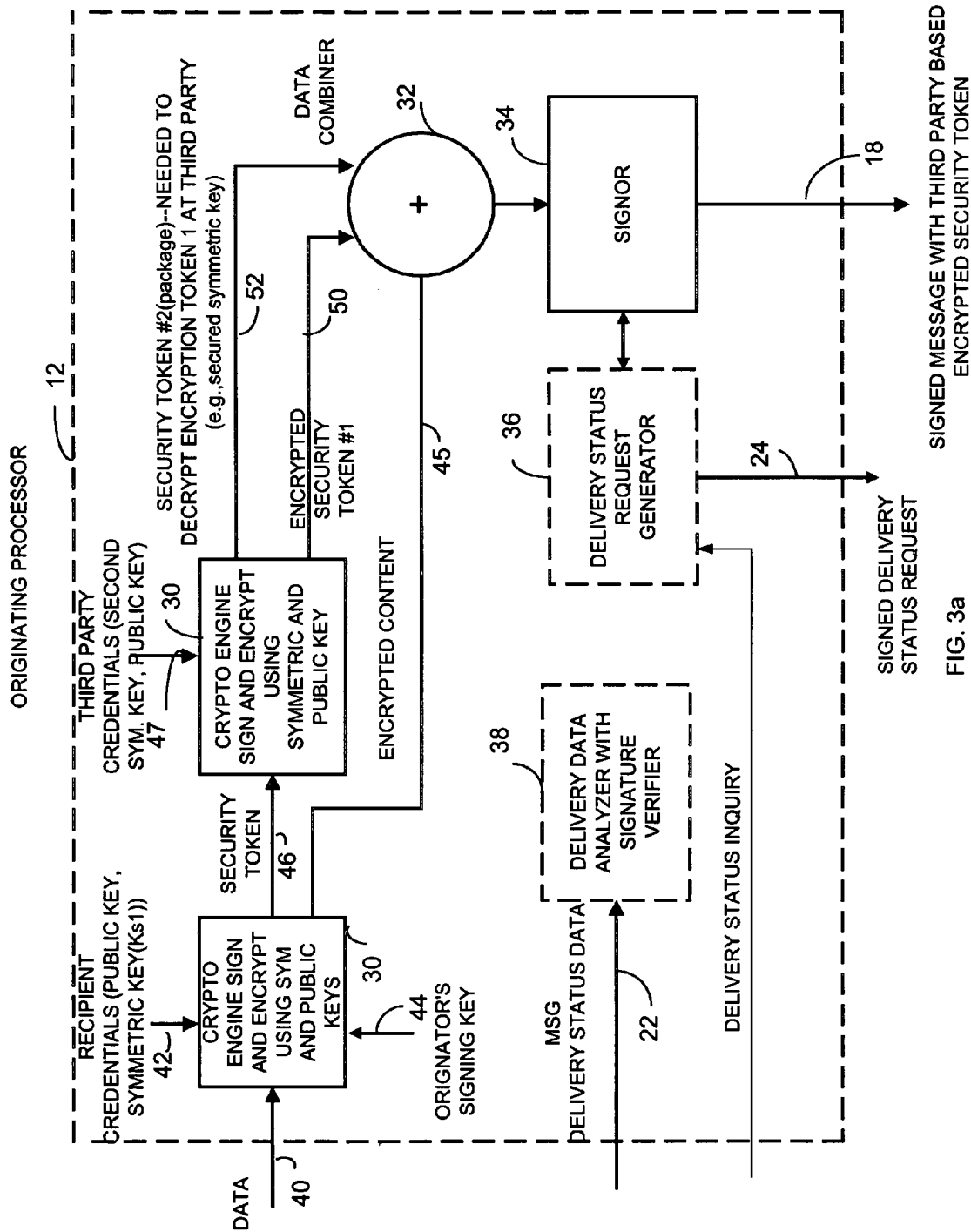
FIG. 3a is a block diagram illustrating one example of an originating processor in accordance with one embodiment of the invention.
Figure 3B:
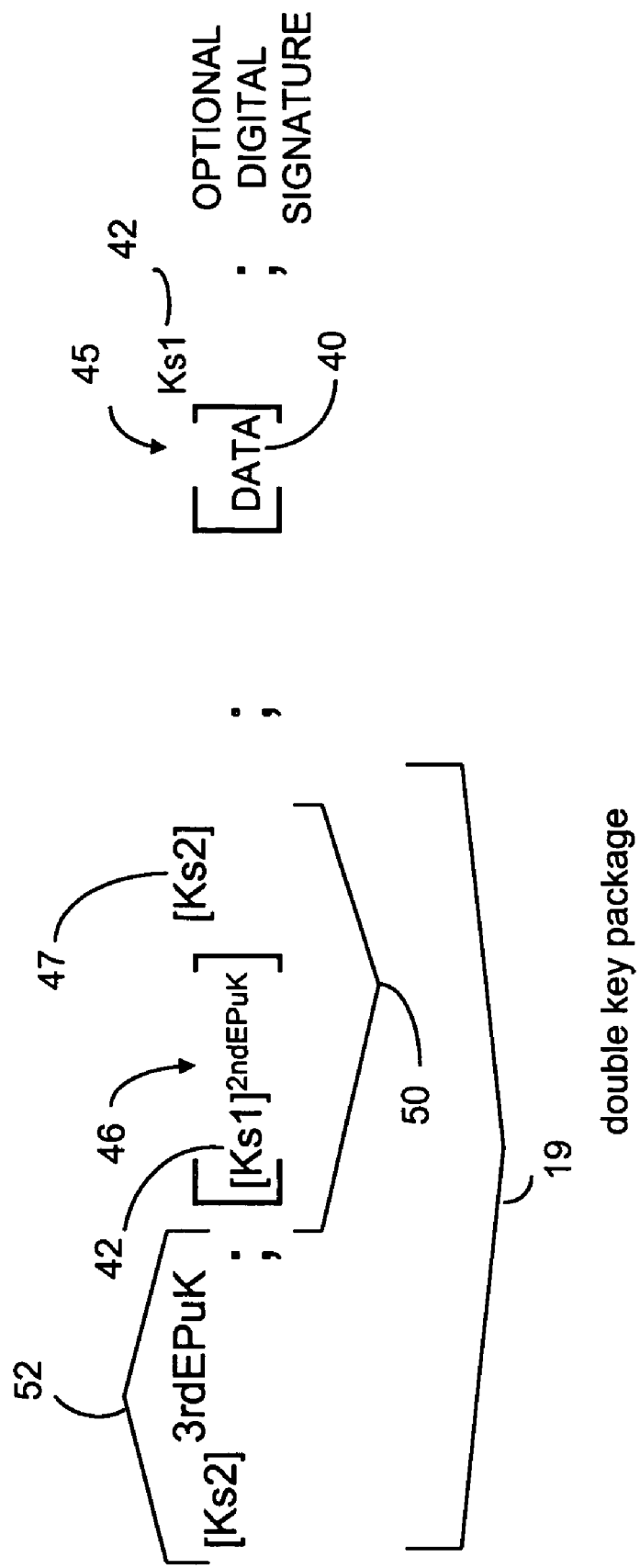
FIG. 3b illustrates a representation of a double key package in accordance with one example of the invention.

Referring to FIGS. 3a–3b, one example of an originating processor 12 has a cryptographic engine 30, a data combiner 32, a digital signature provider 34 (which may also be part of the crypto engine 30), an optional delivery status request generator 36, and an optional delivery data analyzer with signature verifier 38. In this embodiment, the cryptographic engine 30 operates as a digital signature generator and a data encryptor. The cryptographic engine 30 receives the data 40 to be encrypted along with recipient cryptographic credentials 42. The cryptographic security credentials 42 for the recipient may include, for example, a recipient's public encryption key, and a first symmetric encryption key (Ks1). The cryptographic engine 30 also receives the originator's public signing key 44 to facilitate optional application of a digital signature to the clear text data.

The cryptographic engine 30 generates ciphertext by encrypting the data 40 with the first symmetric encryption key (Ks1) or other suitable cryptographic key resulting in message data 45. The cryptographic engine 30 also generates a security token 46 (e.g., first key package) produced by encrypting the symmetric cryptographic key (Ks1) using another encryption key, such as an asymmetric encryption key (2ndEPuK) associated with the second-party or processor. For example, the symmetric encryption key (Ks1) used to encrypt the data may be wrapped with the recipient's public encryption key. The cryptographic engine 30 receives the security token 46 represented as $[Ks1]^{2ndEPuK}$. The security token 46 is then encrypted using a second symmetric key (Ks2) 47 associated with the third party to produce a first key package 50 (e.g., encrypted security token). Then the second symmetric key (Ks2) 47 is encrypted using another encryption key (3rdEPuK) associated with the third party to produce a second key package 52. The encryption key (3rdEPuK) may be, for example, a public encryption key of the third party. The combiner 32 may be part of the cryptographic engine 30 and combines the double key package 19 with the encrypted data 45. The double key package may be again signed by the originator using the originators private signing key through signor 34.

As such, the security token 46 is encrypted using a second symmetric key (Ks2) 47 resulting in first encrypted security token 50 and the security token 50 is encrypted (e.g., the second symmetric key is then encrypted) using the third-party encryption public key (3rdEPuK) to generate the double key package 19. The signed message with third-party based encryption security token 18 is then sent to a recipient wherein the recipient must then request the third-party processor to partially decrypts the double key package 19 to recover a decryption key package (e.g., package 50) using a private decryption key of the public key pair containing (3rdEPuK). In this embodiment, the decryption key package includes the second symmetric key (Ks2) so it may then be used to decrypt the decryption package to obtain the key (Ks) to subsequently decrypt the message data 45 using symmetric key (Ks1).

The delivery status request generator 36 generates the signed status request data 24 requesting the third-party processor to indicate whether a signed message 18 was received by recipient. The delivery data analyzer 38 waits for the message delivery status data 22 from the third-party in response to the signed status request. The delivery data analyzer 38 verifies the digital signature of the message delivery status data which is signed by the third-party preferably. If the signature verifies correctly, the originating processor then analyzes the remaining data to determine whether the message 18 was delivered to the recipient.

Alternatively, the third party may provide, instead of the symmetric decryption key 47 to the second party, but may use the decryption symmetric key to decrypt the encrypted key package 50 and send only the key package 46 back to the second party.

Figure 4:
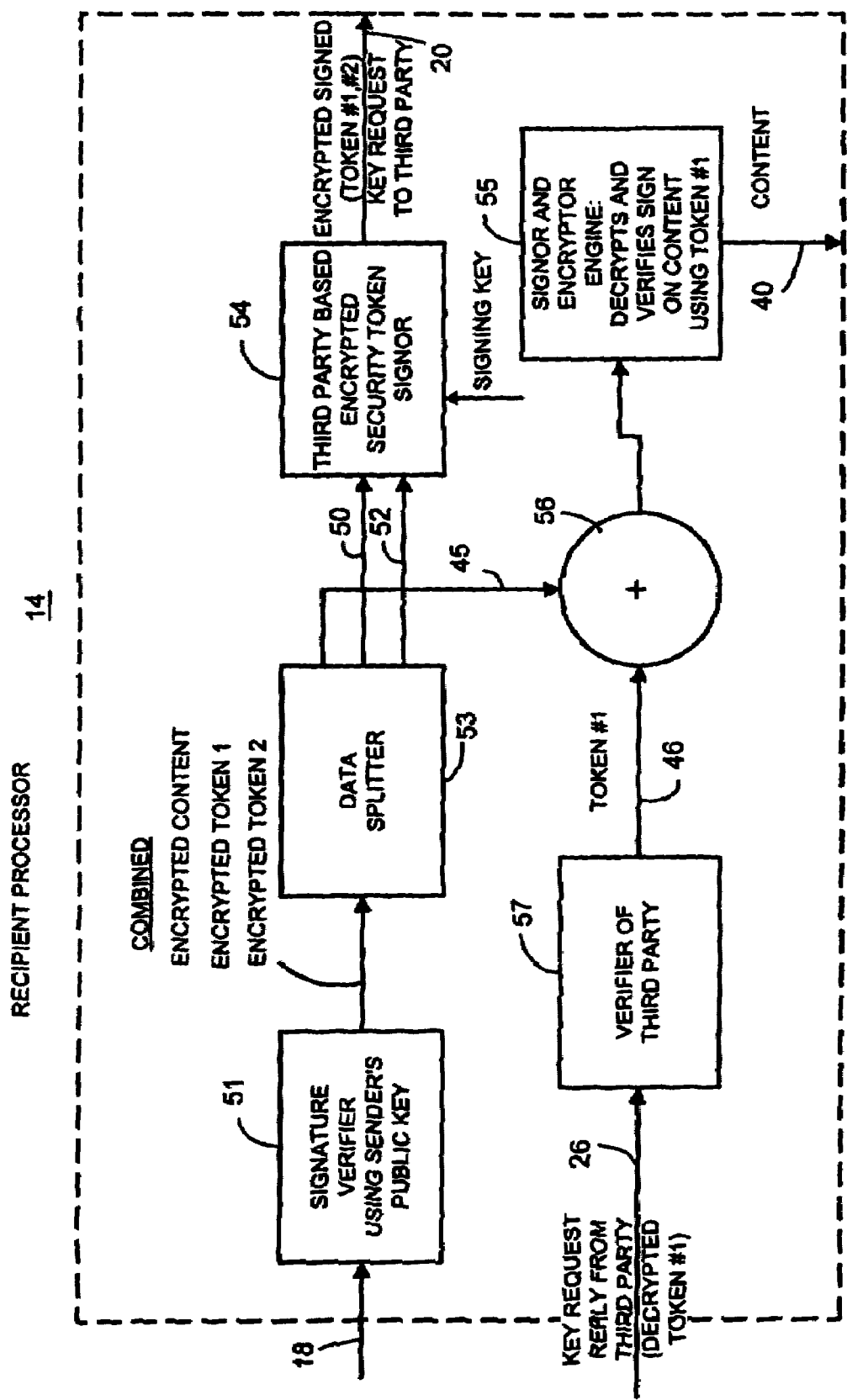
FIG. 4 is a block diagram illustrating one example of a recipient processor in accordance with one embodiment of the invention.

FIG. 4 illustrates one example of the recipient processor 14 having a signature verifier 51, a data splitter 53, a third-party based encrypted token signer 54. The signer 54 may be part of a cryptographic engine 55 that facilitates digital signing, encrypting and decrypting of data. In addition, the recipient processor 14 includes a data combiner 56. The signature verifier 51 receives the signed message with third-party based encrypted security token 18 and verifies that the originator's signature on information 18 is that associated with the originating processor. This may be done using any traditional digital signature verification techniques as known in the art. The signed message with third-party based encrypted security token 18 includes encrypted content and a first encrypted token 50 and second 52 encrypted token as previously noted. The data splitter 53 splits these three components so that the ciphertext 45 is passed to the combiner 56. The two tokens 50 and 52 are then passed to the third-party based encrypted security token signer 54. This digital signer signs the encrypted tokens 50 and 52 using the signing key of the recipient. The output is the key request 20. When the third party has completed processing the key request 20, the recipient processor verifies the signature on the request reply 26 from the third-party using the verifier 57. The result is the security token 46.

The combiner 56 then combines the token 46 with the ciphertext then passes the information to the signer encrypter engine 55. The signer encrypter 55 decrypts the key package 46 using the private decryption key of the recipient processor to obtain the symmetric key [Ks1]. The symmetric key (Ks1) is then used to decrypt the ciphertext that was encrypted using this symmetric key. This results in the content 40.

Figure 5:
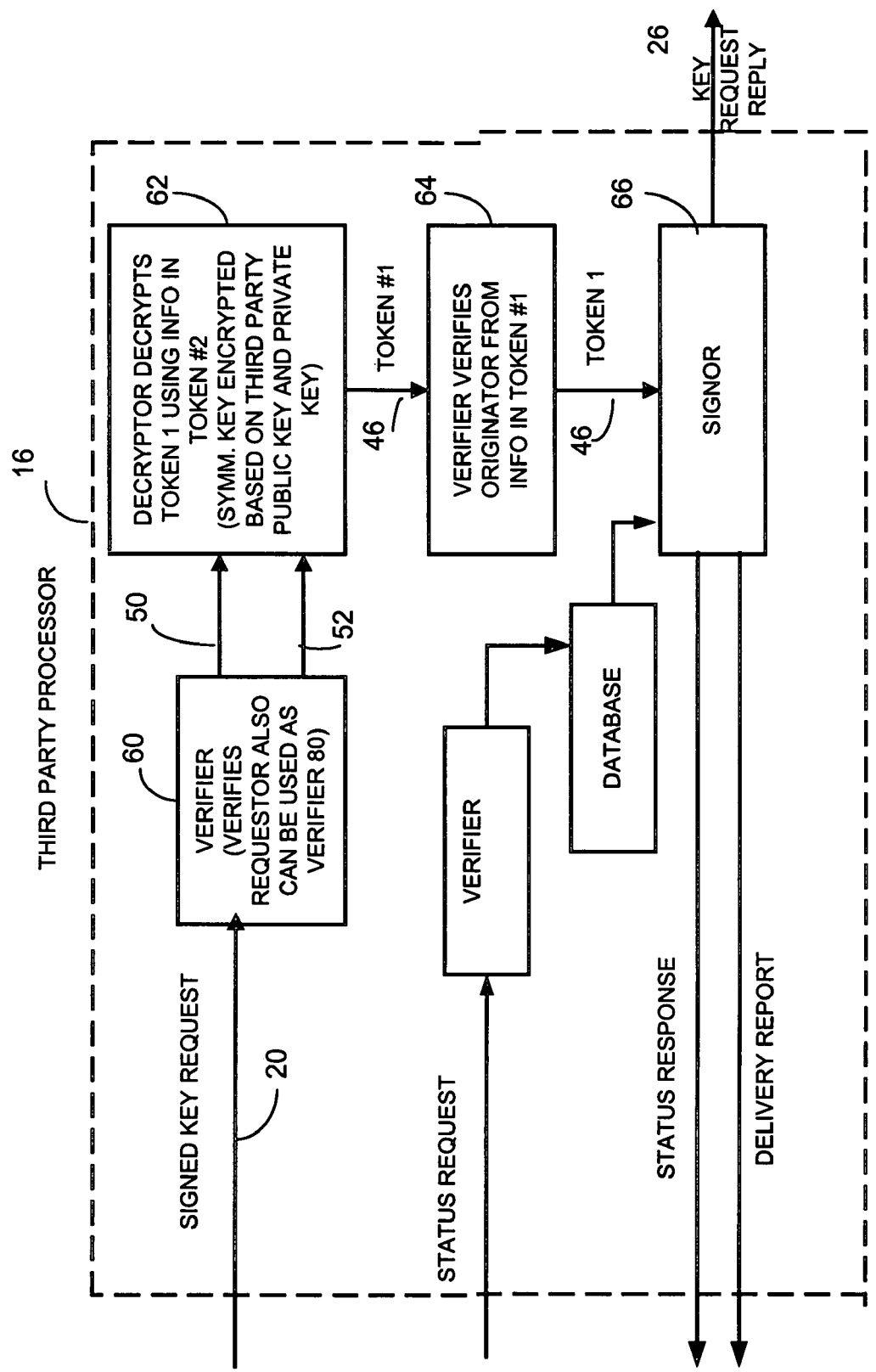
FIG. 5 is a block diagram illustrating one example of a third-party processor in accordance with one embodiment of the invention.

FIG. 5 shows one example of a third-party processor 16 that receives the signed key request 20 from the recipient processor and generates the key request reply to the second-party which includes the decryption key. The third-party processor 16 includes a signature verifier 60 which verifies the requesters signature that is included in the key request

20. In this instance, the recipient signs the key request and hence the recipient's signature is verified using digital signature application procedures as known in the art. The result of the verification is the encrypted tokens 50 and 52. Data decrypter 62 obtains the second symmetric key (Ks2) 47 by using a third-party private decryption key to decrypt the key that was originally encrypted using a public encryption key associated with the third-party processor in 52. Using the second symmetric key (Ks2) 47, the decrypter 62 then decrypts the encrypted security token 50 resulting in the security token 46. Verifier 64 verifies that the digital signature applied to the token is associated with the originator. If the signature is associated with the originator, indicating that the originator has sent the document, the security token 46 is then signed by the third-party processor through digital signer 66, using, for example, the third-party's private signing key. This forms the key request reply 26. In addition the verifier 64 returns a delivery notification (if all operations are successful) or a non-delivery notification (if an operation fails) back to the originator via the signer 66.

Figure 6:
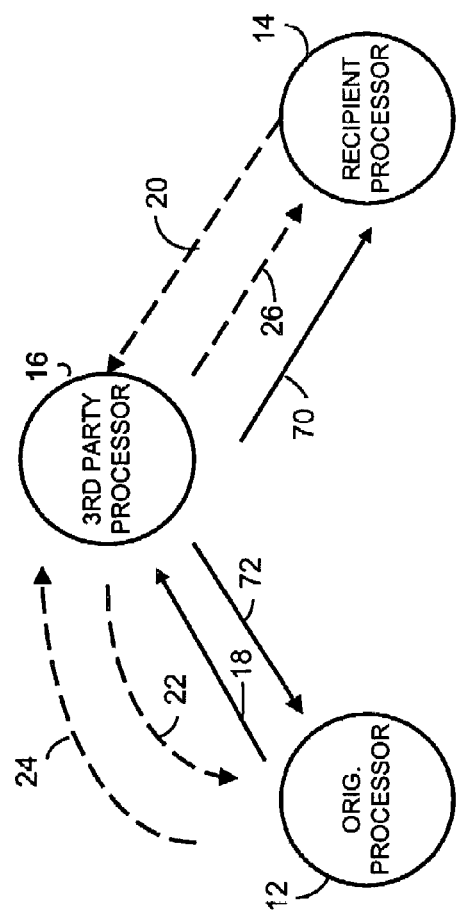
FIG. 6 is a pictorial diagram illustrating another embodiment of an apparatus for securely communicating data in accordance with one embodiment of the invention.

Referring to FIG. 6, an embodiment is shown wherein the encrypted data is first sent to the third-party processor which then forwards the encrypted data to the recipient. If requested by the originator, the third-party processor may generate proof of submission that the message (data) was submitted and transferred to the recipient. As shown, the message 18 is sent to the third-party processor 16. The third-party processor forwards the message 18 to the recipient as shown by arrow 70. The third-party processor may date and time stamp the message and return a proof of submission message 72 back to the originating processor 12. As previously described, the recipient then requests the decryption key to decipher the ciphertext in message 20 and the third-party processor logs the request and returns the decryption key in reply 26. An optional delivery report 76 may be generated and provided by the third-party processor to the originating processor after the reply 26 has been sent to the recipient. The originator may also request that the third party return a notification within a user defined period if the third party has not received a signed key request 20 from the recipient. If desired, the originator may generate a query regarding the status of the message and may receive a response to the query as shown in path 22.

Figure 8:
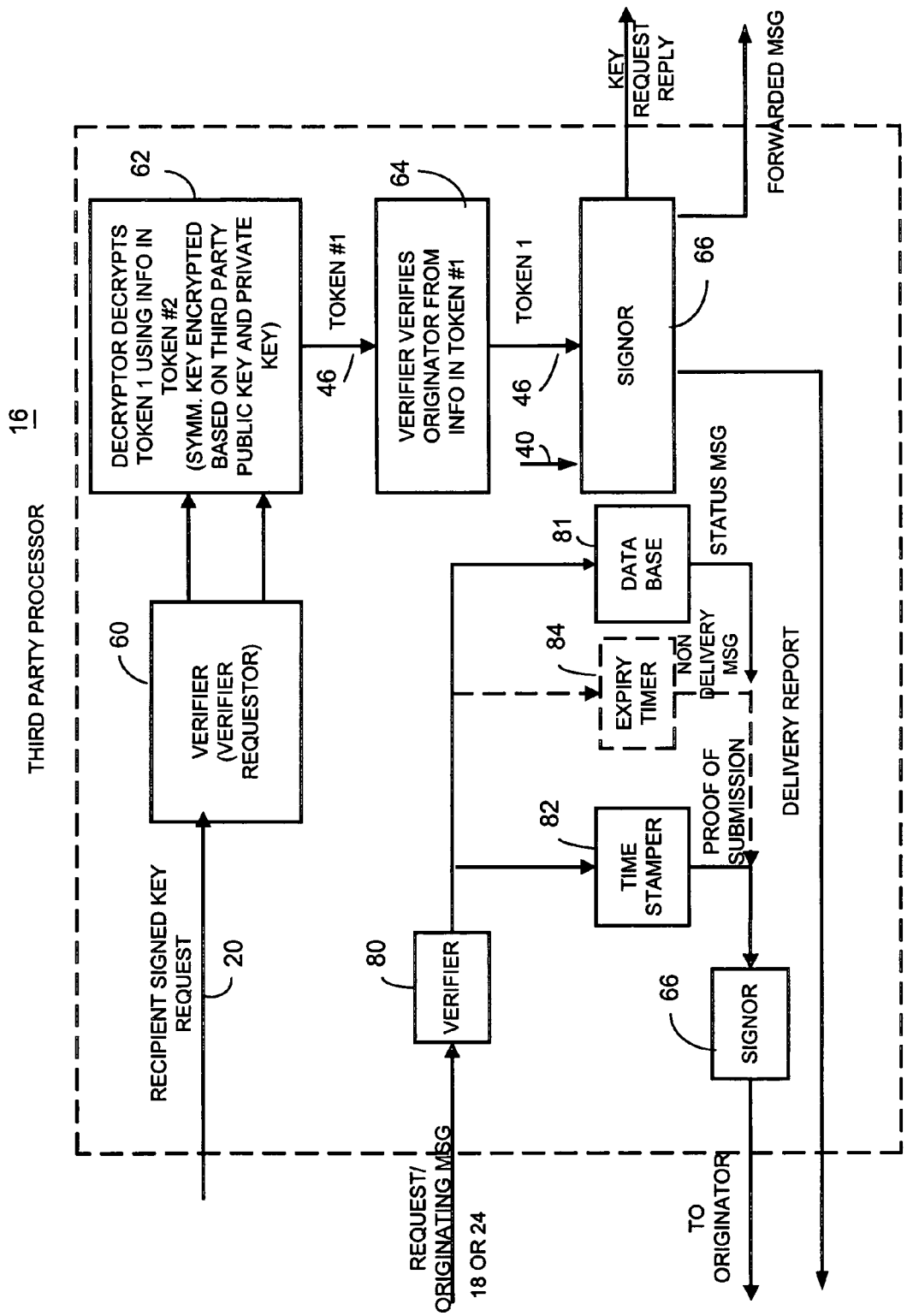
FIG. 8 is a block diagram illustrating an example of an embodiment of the third-party processor shown in FIG. 6.

FIG. 8 shows a third-party processor modified to accommodate the system in FIG. 6. For example, a third-party processor may include part of the verifier 60, a digital signature verifier 80 that receives the delivery status request data and verifies the digital signature in the status request to determine that it came from the appropriate party, as well as the originating message 18. The third-party processor 16 also includes a time stamper 82 an expiry timer 84 and a forwarder 85. The expiry timer 84 may be any suitable timing mechanism and is used to send a non delivery notice to the originting party if the second party has not requested the decryption key from the third party in a set period of time tracked by the expiry timer. The time stamper applies a timestamp and returns a proof of submission to the originator. The forwarder forwards the message to the second party.

The logging of various message information may also be useful. For example, an originators e-mail address, message identifier, number of recipients and message size may be used to determine the appropriate billing to be applied to a particular transaction. Where the postmarked date and time is generated by the third-party processor, a signed message is generated and returned to the originator. The postmark information is also stored in an audit data base, or audit log, associated with the third-party processor. The audit information as previously noted may be passed through a hash function and protected by a MAC. A third-party processor extracts the contents of the received message and forwards it to the recipient and updates the audit log.

FIG. 7 shows one example of the operation of the system shown in FIG. 6. The originating processor, shown in block 700 provides the ciphertext or message data in a double key package to the third-party processor. The third-party processor, as shown in block 702, provides time stamp data in the form of a reply message to the first-party (originating processor) based on receipt of the message data and the double key package. As shown in block 704, the third-party processor provides the message data and double key package to the recipient. As shown in block 706, the third-party processor receives the return double key package from the second-party as part of a request by the second-party to have the third-party processor determine and generate a decryption key.

As shown in block 708, the third-party processor decrypts the double key package using a third-party decryption key, such as a third-party private decryption key, to recover the symmetric decryption key (Ks2) for the second-party's use. As shown in block 710, the third-party processor communicates the recovered decryption key package 50 to the second-party to enable the second-party to decrypt the message data 45 or ciphertext. As shown in block 712, the third-party processor also records the receipt of the double key package from the second-party indicating that the second-party has received the message originally sent by the originating processor.

The above system may be implemented using processors and software such as executable instruction that are readable by a processor or plurality of processing devices. As such one or more storage mediums may contain data representing executable instructions that cause one or more processors to act as the above identified devices. For example, a storage medium may have memory locations containing data representing executable instructions that cause a processing device to provide a double key package to a second party and other memory locations that contain data representing executable instructions that cause a processing device to communicate the double key package to a third party; and to decrypt the double key package to recover a decryption key for the second party using a third party based decryption key to facilitate mandatory communication between the second party and the third party and decryption of data based on the recovered decryption key. The other operations of the above described system may likewise be carried out using software stored in storage mediums.

The above system provides a proof of submission and proof of delivery technique that employs a third party key provider. It should be understood that the implementation of other variations and modifications of the invention in its various aspects will be apparent to those of ordinary skill in the art, and that the invention is not limited by the specific embodiments described. For example, it will be recognized that if the third party public key is of sufficient length, then the security token 46 may be encrypted directly using the third party public key. Also, the operations of the various units may be performed by other units. For example, the key request reply 26 and the verifier 57 can be moved to the third party and the third party transfers the token 46 to the recipient processor to facilitate distributed processing. It is therefore contemplated to cover by the present invention, any and all modifications, variations, or equivalents that fall within the spirit and scope of the basic underlying principles disclosed and claimed herein.

What is claimed is:

1. A method for securely communicating data comprising:
   (a) generating cipher text by encrypting data with a first cryptographic key (Ks1) by the first party;
   (b) providing the cipher text to a second party;
   (c) encrypting the cryptographic key (Ks1) using a second encryption key associated with the second party to produce a first key package;
   (d) encrypting the first key package using a third encryption key associated with a third party to produce a double key package;
   (e) providing, by the first party, the double key package to the second party;
   (f) communicating, by the second party, the double key package to the third party; and
   (g) decrypting, in part, the double key package to recover a decryption key for the second party using a third party based decryption key to facilitate mandatory communication between the second party and the third party and decryption of data based on the recovered decryption key.

2. The method of claim 1 including:
   receiving the double key package by the second party; and
   communicating the recovered decryption key to the second party.

3. The method of claim 1 wherein the double key package includes the decryption key that is used to decrypt the encrypted data protected through a double application of asymmetric public key encryption.

4. The method of claim 3 wherein the decryption key is a symmetric key and wherein the double application of asymmetric public key encryption is performed using a public key associated with the second party while another application of asymmetric public key encryption uses a public key associated with the third party.

5. The method of claim 1 including:
   providing, by a first party, a double key package to a second party;
   communicating, by the second party, the double key package to a third party;
   decrypting, in part, the double key package to recover a decryption key for the second party using a third party based decryption key to facilitate mandatory communication between the second party and the third party and decryption of data based on the recovered decryption key;
   generating cipher text by encrypting data with a first cryptographic key (Ks1) by the first party;
   providing the cipher text to the second party;
   encrypting the cryptographic key (Ks1) using a second encryption key associated with the second party to produce a first key package;
   encrypting the first key package using a third encryption key associated with the third party to the produce an encrypted first key package; and
   encrypting the third encryption key with a fourth encryption key associated with the third party to produce a second key package,
   wherein the double key package includes the second key package and the encrypted first key package.

6. The method of claim 5 wherein the first cryptographic key is a symmetric key, the second encryption key is an asymmetric public key, the third encryption key is a symmetric key and the fourth encryption key is an asymmetric public key.

7. The method of claim 1 including recording, by the third party, receipt of the double key package from the second party to facilitate message data delivery tracking.

8. The method of claim 6 including:
   generating message delivery status data, by the third party, in response to a signed status request;
   processing the signed status request by verifying a digital signature on the signed request; and
   determining authorization of a party seeking the request based on identification data obtained from the signed request.

9. A method for securely communicating data comprising:
   (a) generating cipher text by encrypting data with a first cryptographic key (Ks1) by a first party;
   (b) encrypting the cryptographic key (Ks1) using a second encryption key associated with a second party to produce a first key package;
   (c) encrypting the first key package using a third encryption key associated with a third party to produce a double key package;
   (d) providing, by the first party, message data including the cipher text and the double key package to the third party;
   (e) providing, by the third party, the message data and the double key package to the second party;
   (f) receiving back from the second party, by the third party, the double key package;
   (g) decrypting, in part, the double key package using a third party decryption key to recover a decryption key for the second party to provide mandatory communication between the second party and the third party; and
   (h) communicating the recovered decryption key package to the second party to enable decryption of the message data by the second party.

10. The method of claim 9 including providing time stamp data by the third party to the first party based on receipt of the message data and the double key package.

11. The method of claim 9 including:
    encrypting the third encryption key with a fourth encryption key associated with the third party to produce a second key package,
    wherein the double key package includes the second key package and the encrypted first key package.

12. The method of claim 11 wherein the first cryptographic key is a symmetric key, the second encryption key is an asymmetric public key, the third encryption key is a symmetric key and the fourth encryption key is an asymmetric public key.

13. The method of claim 9 including recording, by the third party, receipt of the double key package from the second party to facilitate message data delivery tracking.

14. The method of claim 9 including:
    generating message delivery status data, by the third party, in response to authorized status request data;
    processing the authorized status request by verifying the authorized request; and
    determining authorization of a party seeking the request based on identification data obtained from the authorized request.

15. The method of claim 14 wherein the authorized request is a signed request.

16. An apparatus for securely communicating data comprising:
    a first party cryptographic engine, operatively coupled to receive data for encryption, and adapted to produce a double key package wherein the double key package includes a decryption key that is used to decrypt the encrypted data protected through a double application of asymmetric public key encryption encrypts the first cryptographic key (Ks1) using a second encryption key associated with a second party to produce a first key package, and encrypts the first key package using a third encryption key associated with a third party to the produce the double key package; and a combiner, operatively coupled to combine the double key package with the cipher text.

17. The apparatus of claim 16 including a digital signor that applies a digital signature associated with a first party to at least one of the double key package and the cipher text to produce a signed message with a third party based encrypted security token.

18. The apparatus of claim 16 including:
a delivery status request generator that generates authorized proof of delivery request data for the third party;
a proof of delivery analyzer operatively coupled to receive proof of delivery data based on third party receipt of the double key package and the authorized delivery request data, and
a request verifier operative to verify authorization data associated with the proof of delivery data.

19. The apparatus of claim 18 wherein the authorization data includes digital signature data.

20. An apparatus for securely communicating data comprising:
a double key package evaluator wherein the double key package is generated by a first party; and
a double key package decryptor that partially decrypts the double key package to recover a decryption key package for a second party using a third party based decryption key to facilitate mandatory communication between the second party and the third party and decryption of data based on the recovered decryption key;
wherein the double key package includes a decryption key that is used to decrypt the encrypted data protected through a double application of asymmetric public key encryption.

21. The apparatus of claim 20 wherein the double key package decryptor communicates the recovered decryption key package to the second party.

22. The apparatus of claim 21 including a time stamp generator providing time stamp data to the first party based on receipt of message data and the double key package from a second party.

23. The apparatus of claim 20 a time stamp generator providing time stamp data to the second party indicating when the first party sent message data to the third party.

24. An apparatus for securely communicating data comprising:
a first party cryptographic engine, operatively coupled to receive data for encryption, and adapted to produce a double key package wherein the double key package includes a decryption key that is used to decrypt the encrypted data protected through a double application of asymmetric public key encryption;
a combiner, operatively coupled to combine the double key package with the cipher text;
a double key package evaluator; and
a double key package decryptor that partially decrypts the double key package to recover a decryption key package for a second party using a third party based decryption key to facilitate mandatory communication between the second party and the third party and decryption of data based on the recovered decryption key.

25. The system of claim 24 including a digital signor that applies a digital signature associated with a first party to the double key package and the cipher text to produce a signed message with a third party based encrypted security token.

26. The apparatus of claim 24 including:
a delivery status request generator that generates authorized delivery request data for the third party;
a proof of delivery analyzer operatively coupled to receive proof of delivery data based on third party receipt of the double key package and the authorized delivery request data, and
a verifier operative to verify the proof of delivery data.

27. The apparatus of claim 26 wherein the double key package decryptor communicates the recovered decryption key package to the second party.

28. The apparatus of claim 27 including a time stamp generator providing time stamp data to the first party based on receipt of message data and the double key package from a second party.

29. A storage medium containing data representing executable instructions comprising:
first memory containing data representing executable instructions that cause a processing device to provide, by a first party, a double key package to a second party;
second memory containing data representing executable instructions that cause a processing device to communicate the double key package to a third party; and to partially decrypt the double key package to recover a decryption key for the second party using a third party based decryption key package to facilitate mandatory communication between the second party and the third party and decryption of data based on the recovered decryption key;
generate cipher text by encrypting data with a first cryptographic key (Ks1) by the first party;
provide the cipher text to the second party;
encrypt the cryptographic key (Ks1) using a second encryption key associated with the second party to produce a first key package; and
encrypt the first key package using a third encryption key associated with the third party to the produce a double key package.

30. The storage medium of claim 29 including data representing executable instructions that cause a processing device to receive the double key package by the second party; and communicate the recovered decryption key package to the second party.

31. The storage medium of claim 29 including data representing executable instructions that cause a processing device to provide the double key package to include the decryption key that is used to decrypt the encrypted data protected through a double application of asymmetric public key encryption.

32. The storage medium of claim 31 wherein the decryption key is a symmetric key and wherein the double application of asymmetric public key encryption is performed using a public key associated with the second party while another application of asymmetric public key encryption uses a public key associated with the third party.

33. The storage medium of claim 29 including data representing executable instructions that cause a processing device to record, by the third party, receipt of the double key package from the second party to facilitate message data delivery tracking.

34. The storage medium of claim 29 including data representing executable instructions that cause a processing device to generate message delivery status data, by the third party, in response to a signed status request; process the signed status request by verifying a digital signature on the signed request; and determine authorization of a party seeking the request based on identification data obtained from the signed request.

35. A method for securely communicating data comprising:
   providing, by a first party, a double key package to a second party;
   communicating, by the second party, the double key package to a third party;
   decrypting, in part, the double key package to recover a decryption key for the second party using a third party based decryption key to facilitate mandatory communication between the second party and the third party and decryption of data based on the recovered decryption key; and
   recording, by the third party, receipt of the double key package from the second party to facilitate message data delivery tracking.

36. The apparatus of claim 24 wherein the first party cryptographic engine encrypts the first cryptographic key (Ks1) using a second encryption key associated with a second party to produce a first key package, and encrypts the first key package using a third encryption key associated with a third party to produce the double key package.

* * * * *